United States Patent [19]

Joel, Jr.

[11] 3,760,110

[45] Sept. 18, 1973

[54] TRAFFIC RECORDING SYSTEM

[75] Inventor: Amos Edward Joel, Jr., South Orange, N.J.

[73] Assignee: Bell Telephone Laboratories Incorporated, Murray Hill, N.J.

[22] Filed: Feb. 24, 1972

[21] Appl. No.: 229,085

[52] U.S. Cl. .................................................. 179/8 A
[51] Int. Cl. .......................................... H04m 15/26
[58] Field of Search ............ 179/8 A, 7 MM, 18 EA

[56] References Cited

UNITED STATES PATENTS 3,115,549 12/1963 Lamneck et al. .................... 179/8 A
3,536,842 10/1970 Ewin et al. ..................... 179/18 EA
3,099,819 7/1963 Barnes ................................ 179/8 A

*Primary Examiner*—Kathleen H. Claffy
*Assistant Examiner*—Kenneth D. Baugh
*Attorney*—W. L. Keefauver and Daniel E. Nester

[57] ABSTRACT

Traffic monitoring equipment includes a concentration stage of switches connected to the apparatus, such as trunks, to be monitored and an expansion stage of switches connected to the recording equipment for scoring or registering trunk usage. A counter sequentially enables the concentration switches. However a memory is provided, and circuitry stores in that memory the identity of the destination of each call on the trunks being monitored. Control circuitry sets the expansion switches in accordance with the call destination of the call on the specific trunk being monitored. Information received from the marker of the associated central office writes into memory the destination codes for each call at an address defined by the specific trunk employed on that call. The trunks are scanned in groups of six with an initial assumption that calls on all will be to the same destination. Accordingly, a match is first attempted between the actual call destination from the memory and the assumed call destination priorly stored in a register from the memory address for a prior trunk. On failure of this match trunk status flip-flops allow the proper call destinations to be used for each trunk.

25 Claims, 7 Drawing Figures

TRAFFIC RECORDING SYSTEM

BACKGROUND OF THE INVENTION

This invention relates to traffic measuring apparatus for communication systems and more specifically to equipment for determining the amount of telephone traffic on trunk groups and individual trunks to various central office destinations.

Traffic studies have primarily been concerned with equipment or trunk usage. Originally this was accomplished on a manual basis either with counters for each trunk that were read by individuals or with indicators which were periodically photographed and the successive photographs then analyzed. More recently traffic monitoring equipment has been provided for automatically recording, as on magnetic tape, coded information indicating the traffic usage for individual trunks or groups of trunks; one such equipment is disclosed in Lamneck-Wichman U.S. Pat. No. 3,115,549, Dec. 24, 1963.

In such equipments, crossbar switches are capable of connecting to the sleeve or busy leads of trunk circuits once each 10 seconds during the busy hour; the cycle time of a 100 seconds is of some significance as occupancy or traffic usage is customarily measured in terms of "100 call seconds" or "CCS" units where a CCS unit is defined as the existence of a predetermined condition, such as trunk usage, for a time interval of 100 seconds. In these prior equipments the trunk sleeve leads are scanned by an input cross-bar switch in groups of six and busy conditions detected; each detector has a generator associated with it which applies a signal through a second set of output crossbar switches to score a register or to pulse a code representing the trunk group onto a magnetic tape. The two sets of crossbar switches are operated in synchronism so that the recorded information indicates the usage of the trunks being scanned.

While this equipment is advantageous in indicating the trunk usage, it provides no information with respect to the telephone traffic to the various possible call destinations. In many instances it is highly desirable to know the final destination of the traffic being handled in a given office regardless of the route actually taken. Knowing where the traffic is going enables a traffic engineer to maintain a better economic balance between direct and alternate routes for that traffic. The present equipment, however, only provides an indication of how many calls are being handled and thus an indication of how many calls will overflow into alternate routes without any indication of why those calls are overflowing in terms of the actual call destinations of the traffic.

Accordingly, a need exists for equipment which will measure traffic usage but on a predetermined basis and specifically on the basis of ultimate call destinations rather than merely trunk occupancy or usage. Such equipment may be referred to as point-to-point traffic usage recording equipment in that it records traffic usage from a specific office, or first point, to the other central offices or call destinations, each of which defines the second point.

SUMMARY OF THE INVENTION

In accordance with one specific illustrative embodiment of my invention the trunks being scanned are connected to input or trunk concentration crossbar switches and the input leads of the recording, metering, or traffic measuring equipment are connected to output or expansion crossbar switches. However, whereas in the prior equipments such switches were operated synchronously with the trunks being scanned in sequence, in accordance with an aspect of my invention, only the trunk crossbar switches are operated in sequence. Instead the output crossbar switches are operated in accordance with specific information pertinent to that trunk and specifically in accordance with the call destination of the connection then existing on that trunk.

Accordingly, I provide a memory for storing at an address defined by each specific trunk number such specific information and particularly in this specific embodiment the identification of the call destination of the communication on that trunk. This information is written into the memory on the basis of identifications provided by the completing marker through a marker connector to the traffic recording equipment of my invention. Specifically, the trunk identification is used as an access address for storing in the memory the national area code and the called office code indications of the call destinations. The memory writing action will interrupt any other use being made of the memory by the traffic measurement circuitry and will overwrite any previously stored information.

A counter advantageously advances the trunk switches in sequence while simultaneously applying appropriate address information to the memory. The output of the memory is stored in a register and controls the output crossbar switches in accordance with the destination code stored at the addressed trunk memory location.

Advantageously each crossbar switch crosspoint comprises six individual contacts so that the setting of the trunk crossbar switch enables a group of six trunks simultaneously. Circuitry is provided for counting these six positions and for logically controlling gating circuitry connected to the detector circuits for gating only one trunk through at a time; however, the outputs of logic circuitry defining this individual trunk signal is connectable at all six contacts of the output switch crosspoints. Again logic circuitry individually selects the appropriate one of the six contacts at the enabled crosspoint of the output switch. In the specific illustrative embodiment set forth herein the logic circuitry for selecting the one of six input switch contacts comprises AND gates while the logic circuitry for selecting the one of six output switch contacts comprises relays, but obviously my invention is not to be considered as limited to the disclosed embodiment.

Since six trunks are contacted simultaneously and then the individual contacts of the enabled crosspoint examined, the circuitry in accordance with a further aspect of my invention operates on the assumption that the six trunks are most likely to be carrying connections all destined for the same distant office. Accordingly, I provide circuitry for initially attempting to employ the code destination information stored in the output switch register as the enabling information for the output crossbar switches. Specifically, a match circuit compares the destination code presently appearing at the output of the memory, and thus indicating the destination of the communication then on that trunk, with the output of the output switch register.

The match operations and the determination of the specific one of the group of six trunks to be utilized are, in accordance with a further aspect of my invention, controlled by six trunk status memory control elements which, in this embodiment are flip-flops. These flip-flops are examined by the circuitry to determine the busy or idle status of the trunks. If, at any given trunk switch setting, all the six trunks connected to the contacts of that switch crosspoint are idle, the flip-flops will all have been operated. In such a situation the trunk address is incremented to the next trunk switch crosspoint and the new group of six trunks examined; again any idle trunks result in the setting of their corresponding control elements.

If any control element or flip-flop is not operated, indicating that some of the trunks being examined at that crosspoint are in fact busy, then the trunk switch counter is advanced to the position corresponding to the first unoperated flip-flop. The output trunk switch register will then be set with the destination code from memory for that trunk and a match made which, of course, will be successful since the memory output is being matched against what had just been placed in the register.

The flip-flop will then be set and the unoperated will again look for the next unoperated flip-flop, indicating the next busy trunk whose traffic had not been registered. If the next trunk is also carrying traffic to the same destination, the process described above is merely repeated. However, if no match occurs at this time, the address counter is first checked to see if it is in its last position. If the counter is not at its last step at this time, this unoperated indication of the memory control flip-flop is merely ignored and the circuitry looks for the next unoerated flip-flop without operating that last memory control flip-flop.

If, however, when no match occurs, the counter is in fact in its sixth or last position, then the trunk switch register is released. The circuitry then again looks for the first unoperated memory control element. When it is located the destination address from the memory for that trunk is stored in the register and the process continued as above.

Whenever all of the control flip-flops have been operated, indicating either that the trunk associated therewith at that switch position is idle or that the registering for the busy condition of that trunk has occurred, the counter controlling the trunk or input crossbar switch is advanced to operate the next crosspoint and the process is repeated.

Since the traffic measurements are taken in CCS units, a clock control is provided so that a new cycle of operations cannot occur until the passage of 100 seconds; thus a full cycle or traffic registration occurs only once every hundred seconds.

Figure 1:
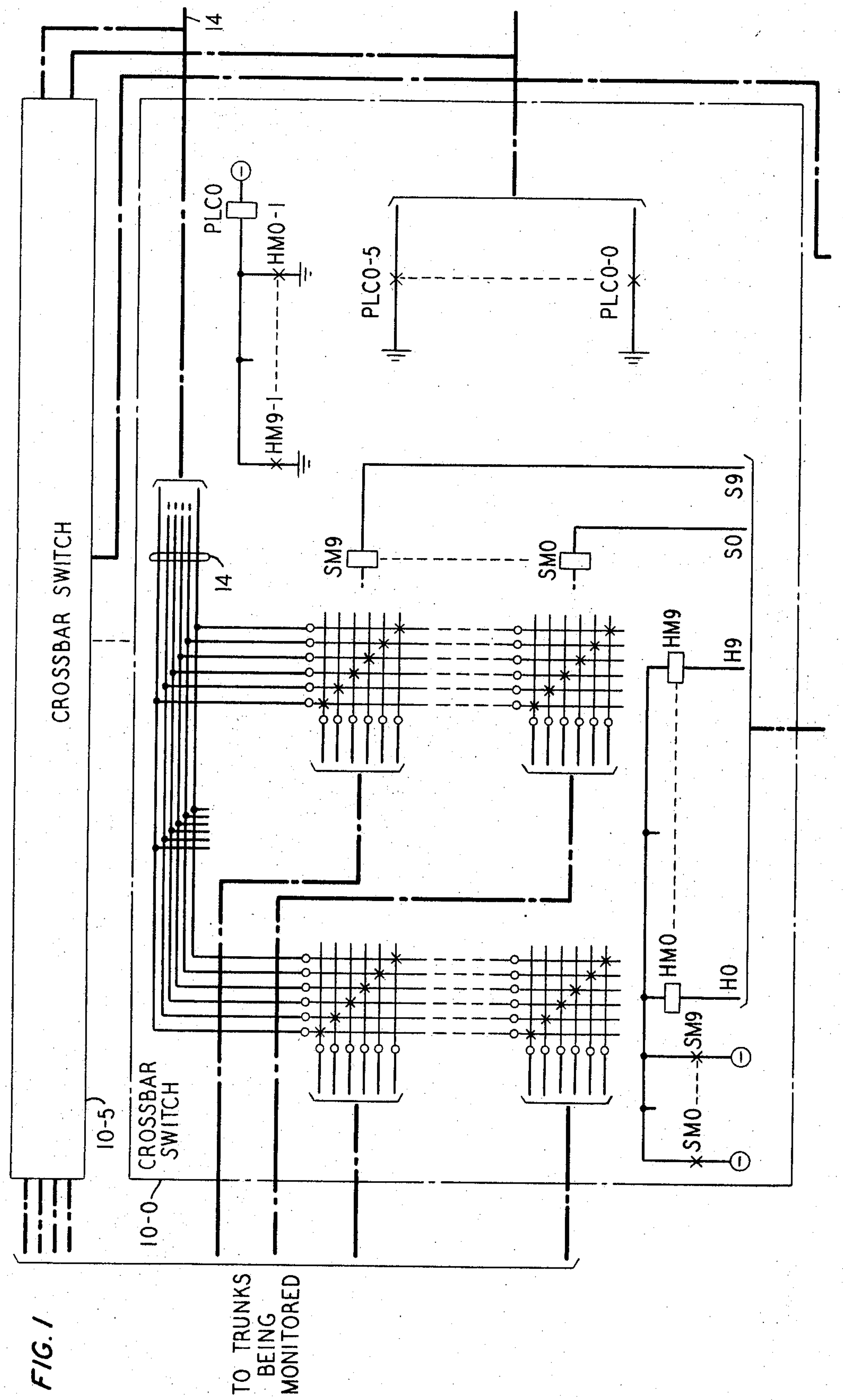
FIGS. 1 through 6, when assembled as indicated in FIG. 7, are a schematic representation of one illustrative embodiment of my invention.
Figure 2:
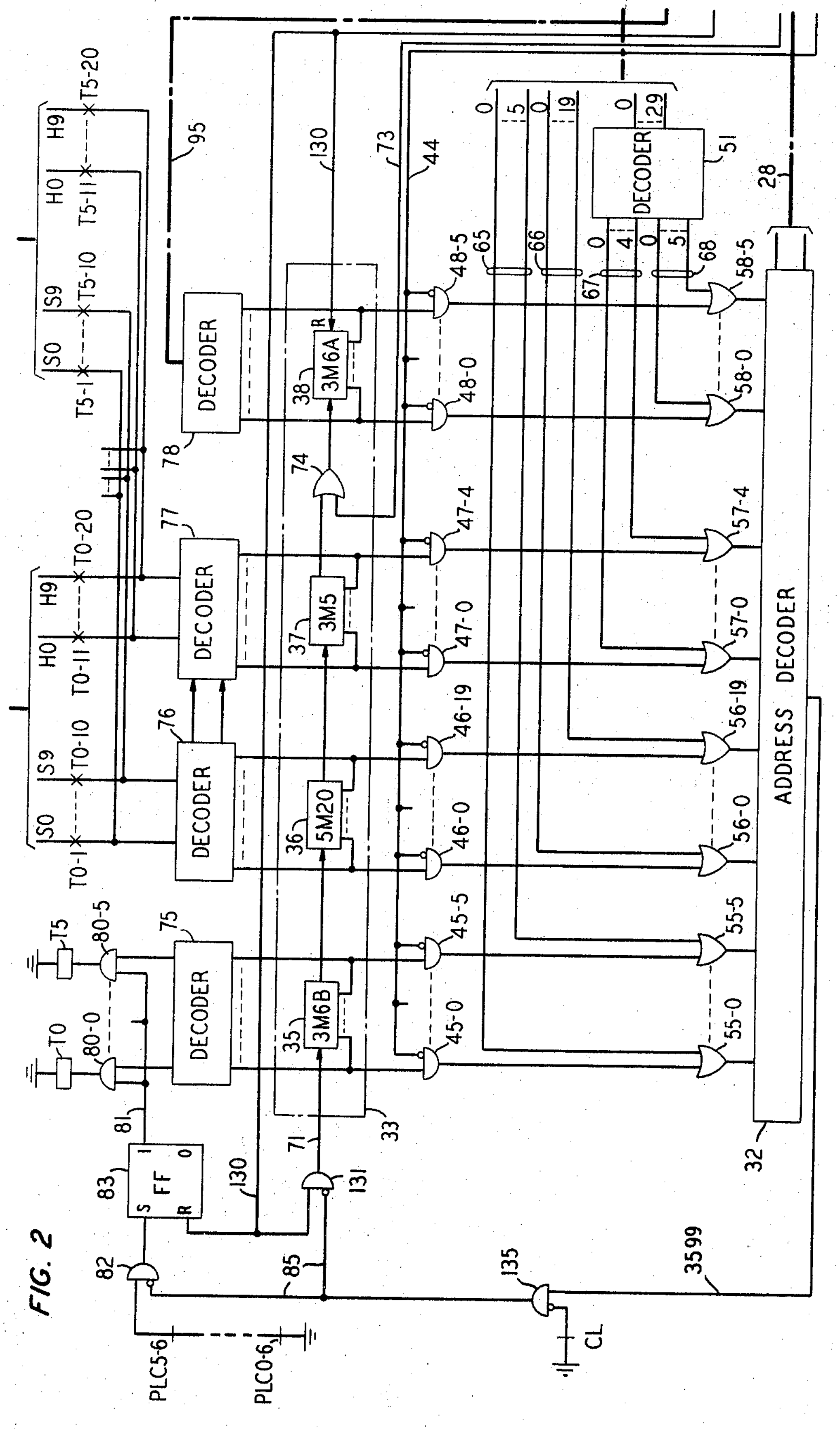
Figure 7:
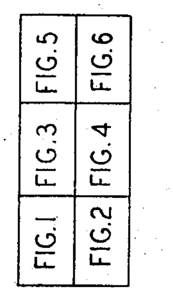
Figure 3:
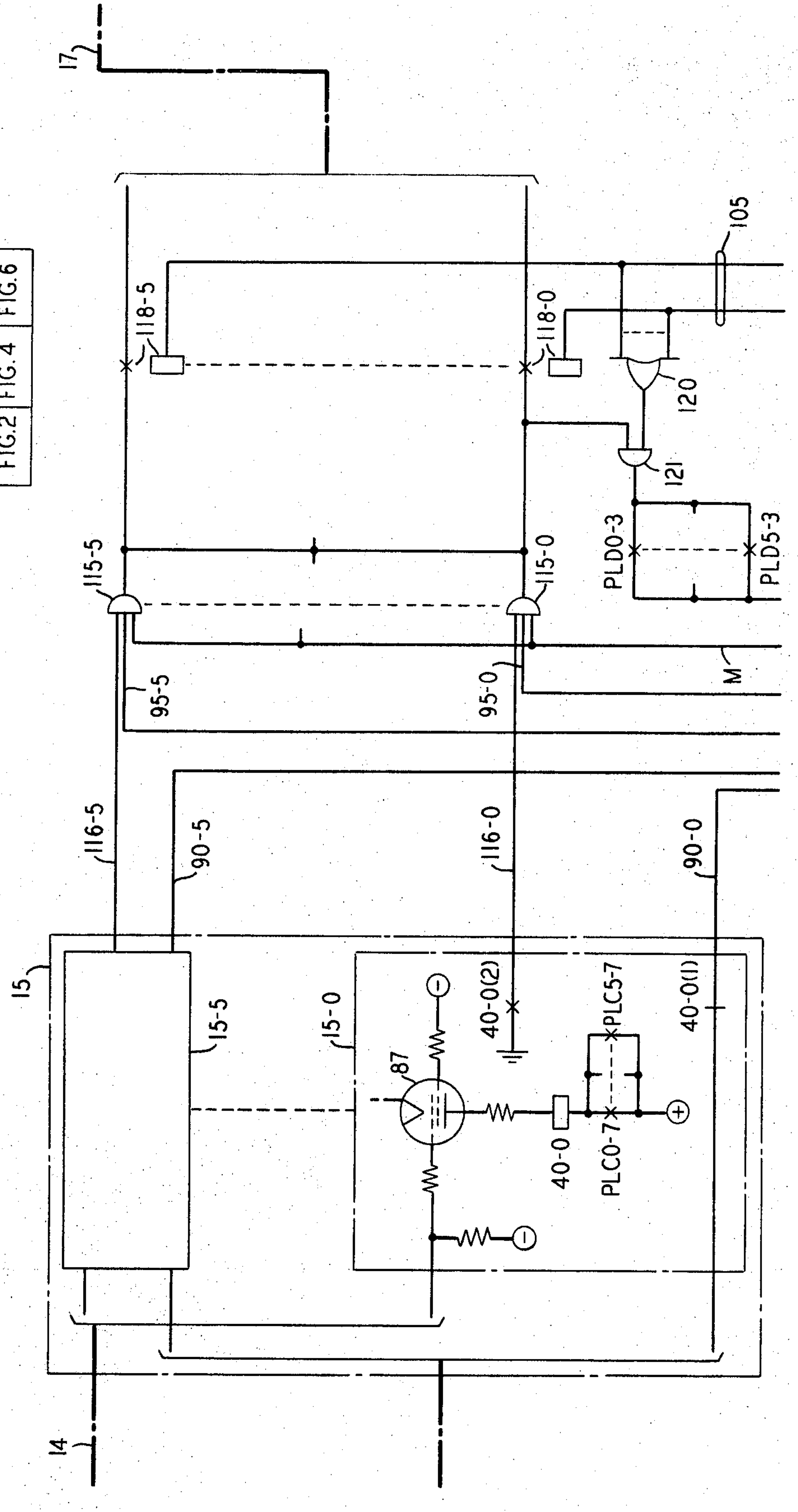
Figure 4:
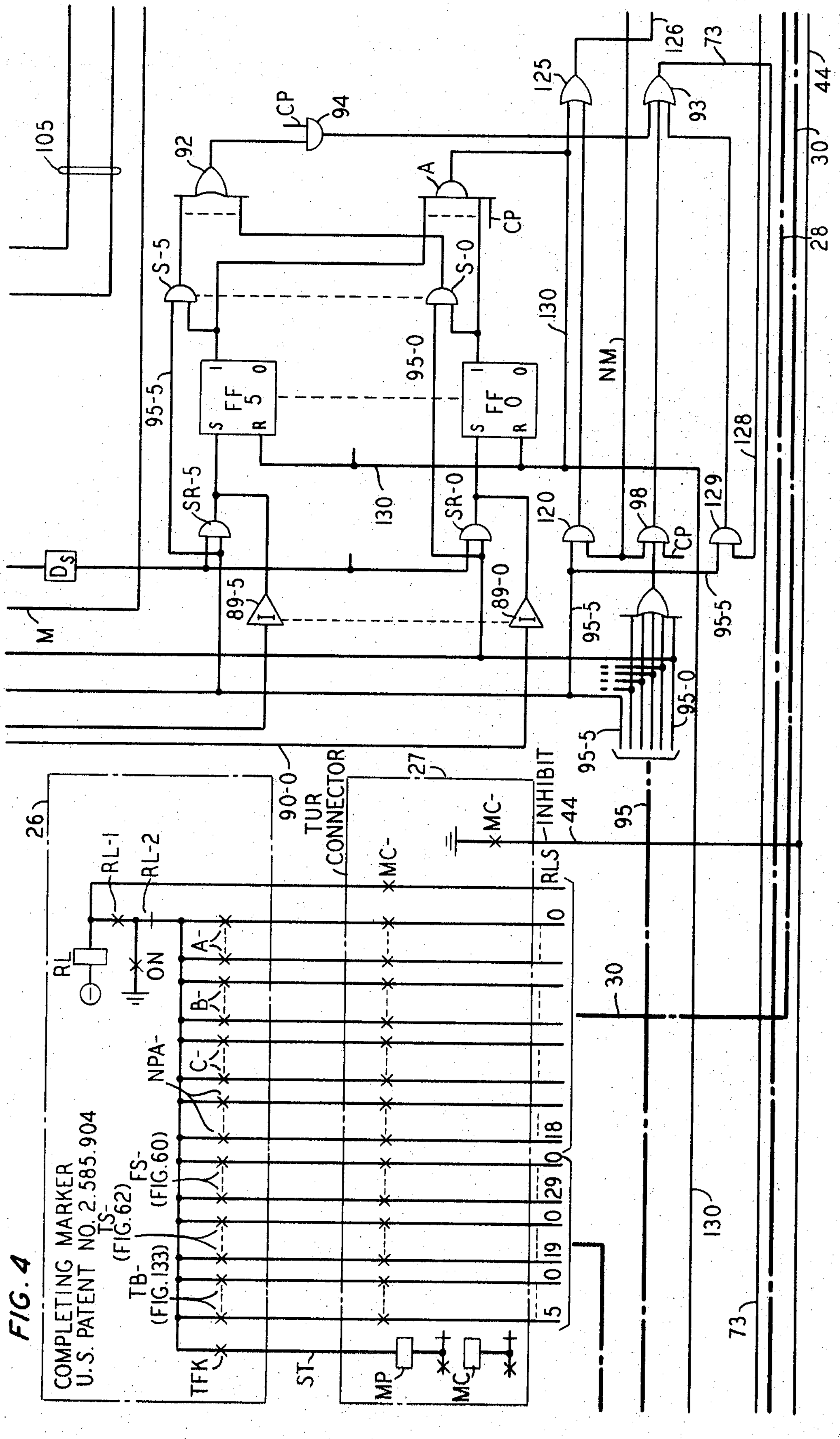
Figure 5:
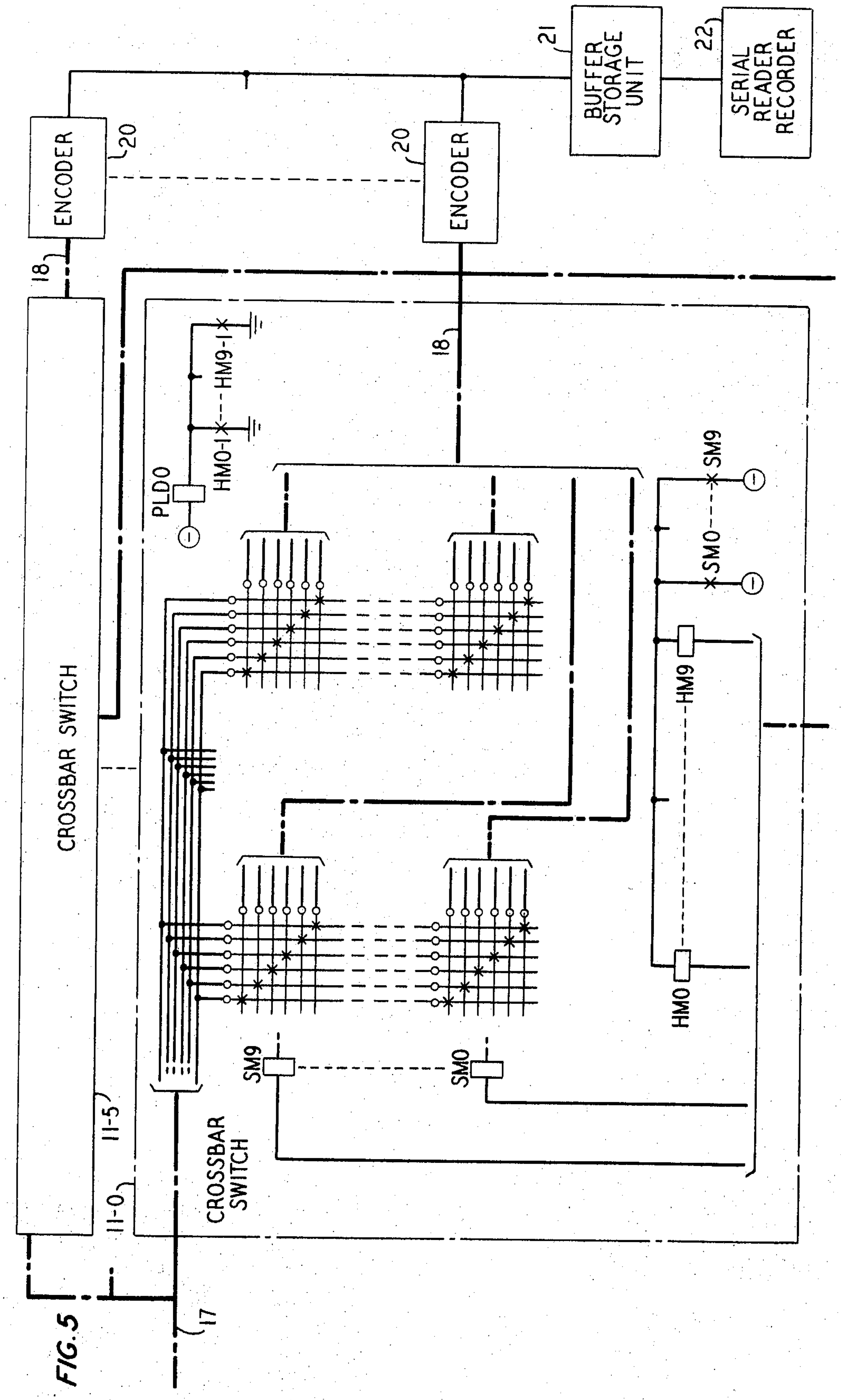
Figure 6:
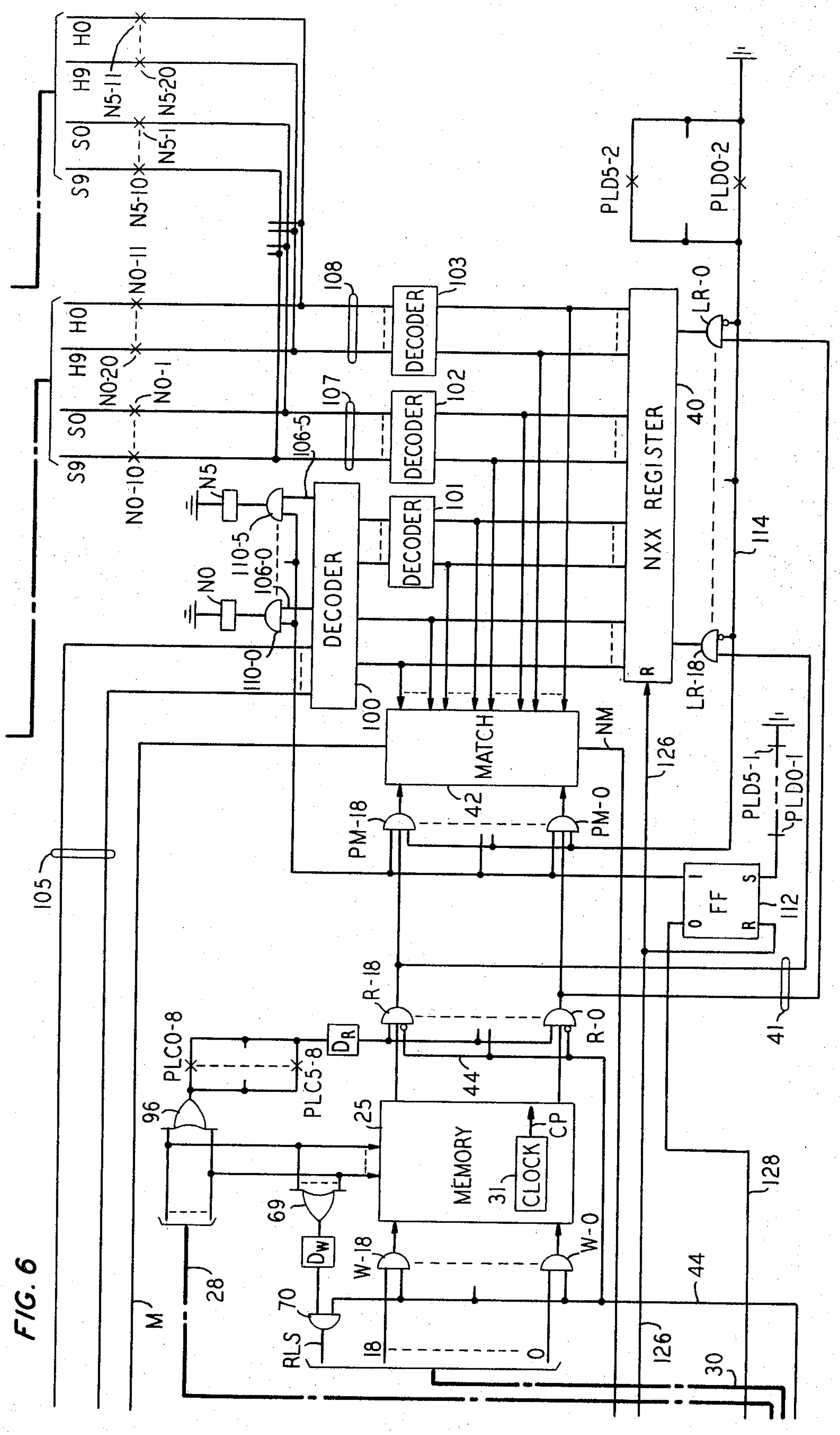

As a guide to the following description it may be noted that the input or trunk concentration switches are depicted on FIG. 1; the detector and signal generating circuitry responsive to an output from a trunk switch is depicted on FIG. 3; the output or NXX expansion switches are depicted on FIG. 5; the trunk address counting and decoding circuitry is depicted on FIG. 2; the marker of the associated office and the memory control flip-flops are depicted on FIG. 4; and the memory and circuitry associated with the control of the output switches are depicted on FIG. 6.

I. General Description

Turning now to the drawing, my invention includes six concentrator crossbar switches 10-0 to 10-5, hereinafter referred to as the trunk switch, and six expander crossbar switches 11-0 to 11-5, hereinafter referred to as the NXX switch. Each of the crossbar switches 10 and 11 is advantageously a six wire switch providing 100 crosspoints each have six individual contacts.

The horizontals of each of the six trunk switches 10 are connected to the sleeve leads of six hundred individual trunks of the 3600 trunks to be monitored. The verticals of the trunk switch 10 are multiplied together to six leads 14 individually applied to detectors 15. Six individual detector circuits, such as 15-0 through 15-5, are provided, there being one such detector for each contact at a crosspoint of the trunk switch 10. As further described below operation of one of the detectors 15 will, under certain conditions in accordance with my invention, apply a signal to one of six leads 17 multiplied to the verticals of the NXX crossbar switches 11. The individual horizontals of the NXX switch are connected to 3600 leads 18 applied to appropriate traffic registering equipment which may include encoders 20, a buffer storage unit 21, and a serial reader recorder 22. It should be noted that while, in this specific embodiment, six NXX switches 11 are utilized providing 3600 output leads, the number of NXX switches and output leads need not be the same as the number of trunk switches 10 and trunks being monitored but may be larger or smaller depending on the number of office codes for which traffic measurements are desired for the specific number of monitored trunks.

The crossbar switches 10 and 11 and various other equipments of this embodiment are generally of the types described in Lamneck et al. U.S. Pat. No. 3,115,549, Dec. 24, 1963, and will not be further discussed herein. In this prior arrangement employing concentration and expansion crossbar switches, for the purpose of monitoring trunks and registering the monitored information, the two switches, such as 10 and 11, have been operated in synchronism and sequentially operated successively to close their contacts. This enables the traffic registers to obtain traffic usage records on the basis of the identification of the trunk being monitored.

In accordance with my invention, traffic usage records may be obtained not on the basis of the trunk being monitored but on the destination to which the traffic is being directed.

Specifically, I employ a marker 25, FIG. 6, which cooperates with the completing marker 26, FIG. 4, of the associated central office to control the operation of the traffic usage register in accordance with my invention. Marker 26 may advantageously be a completing marker of a No. 5 Crossbar System, such as the combined dial tone and completing marker as described in A. J. Busch U.S. Pat. No. 2,585,904. Each time the completing marker 26 establishes a connection to a trunk, as described in the Busch patent, the marker, in accordance with an aspect of my invention, makes a bid for the connector 27 where it competes with other markers for access to the memory 25 and other control circuits in accordance with my invention. When the marker 26 is connected to the memory 25, it addresses the memory with the trunk number over cable 28, as described further below, and stores in that address location over leads 30 the NXX or office code and NPA or area code, if any, associated with the call which it has just routed through that trunk. This memory writing action serves to interrupt any use being made of the memory 25 by the traffic usage register. As soon as this writing, which takes only a few milliseconds, is completed, the connector 27 is released so that other markers, if waiting, can access the memory 25 through the connector 27. It should be noted that information written into the memory 25 automatically overwrites or replaces information previously written at the same address.

Memory 25 may simply comprise a magnetic core matrix, disc file, or other known memory wherein may be stored the destination numbers of the called office codes, including the national numbering plan or NPA codes, if any, at the addresses defined by the trunk numbers. Since 3600 trunks may be monitored by the traffic usage recorder of my invention, as connected to the horizontals of the trunk switch 10, the memory 25 includes 3600 address locations each containing 19 bit positions for storage of the called office codes. Memory 25 may also advantageously include a clock source 31 providing clock or strobe pulses for the memory operations, as is known, and for other circuit operations, as described further below.

The point-to-point traffic usage recorder in accordance with this specific illustrative embodiment of my invention further includes an address decoder 32, FIG. 2, for receiving and registering the trunk numbers from the marker 26 and decoding them for application over cable 28 to the memory 25 to address the memory, as discussed above; a counter 33, FIG. 2, comprising individual counters 35, 36, 37, and 38, and involved in addressing the trunk switch 10, as described further below; an NXX register 40, FIG. 6, for receiving from the memory 25 over leads 41 the read out called office codes for application to the NXX switch 11 and to a match circuit 42; and a set of six trunks status memory control flip-flops FF-0 through FF-5, FIG. 4, which are involved in controlling the generation of the signals from the detectors 15 at the output of the trunk switch 10 to the inputs of the NXX switch 11 and in other control operations.

Accordingly, the counter 33 and decoders 75, 76, and 77 serve to control the trunk crossbar switch 10 which scans the sleeve leads of the 3600 trunks being monitored. The NXX register 40 is located by information read from the memory 25 and it in turn controls the output of NXX switch 11. Thus, the trunk NXX switches are, in accordance with an aspect of this embodiment of my invention, operated independently.

II. Detailed Description

1. Marker Modification

The operation of a traffic usage recorder in accordance with my invention commences with operation of the marker or other control circuitry of the associated central office. In this specific embodiment, a number of contacts have been added to various of the relays in the completing marker of a central office known as a No. 5 Crossbar Office, which is generally described in A. J. Busch U.S. Pat. No. 2,585,904, Feb. 19, 1952. Specificially, the number of a trunk being employed on a specific connection through the office is produced from additional contacts on the six TB-, 20 TS- and 30 FS-relays in the completing marker; for ease of appreciating the connection of circuitry in accordance with my invention to the telephone system of the Busch patent there is shown next to these relay contacts a figure number indicating the location of these relays in the Busch patent.

The 15 A-, B-, and C- relays in the central office are set by the called office code received by the marker from the originating register, not shown. Similarly, the four NPA- relays are operated as a result of interpreting the three digits of the national area code which precede the office code on a 10-digit call. Operation of these relays causes closure of their respective A-, B-, C-, and NPA- contacts in the completing marker to identify the destination of the call being served by the trunk on that specific connection through the office.

When the marker reaches a point in its operation where a particular trunk has been chosen, the TFK relay (not shown) operates, closing the TEK contacts in the marker and placing a ground on the start lead ST for the TUR connector 27, thereby operating the marker preference relay MP in the connector to enable this marker to compete with other markers for access to the connector 27 in the well-known manner.

2. Writing into the Memory

If the connector 27 is available, operation of the marker preference relay MP causes the marker connector relays MC to operate, as is known. In this embodiment of my invention, operation of the marker connector relays MC closes the MC- relay contacts to connect 75 leads from the marker through the connector 27 to the traffic usage recorder in accordance with my invention. These 75 leads include 56 leads identifying the trunk number and 19 leads identifying the destination of the call on that trunk. In addition the inhibit lead 44 is grounded to prevent reading of the memory, by applying an inhibit signal to the reading gates R-0 through R-18; to enable writing of the memory by applying enabling signals to the writing gates W-0 through W-18; and to inhibit the readout of the memory address counters 35 through 38 by applying inhibit signals to the counter gates 45, 46, 47, and 48, FIG. 2.

The 56 leads representing the trunk number are applied to the address decoder 32 the output of which, over cable 28, defines the specific one of the 3600 address locations in the memory 25 to be addressed. Specifically, in this embodiment of my invention, the 30 FS- leads are connected to a preliminary decoder 51 which provides a preliminary decoding from 1-out-of-30 to 1-out-of-5 on leads 67 and 1-out-of-6 on leads 68; leads 67 and 68 are connected through OR gates 57 and 58 to the address decoder 32. The TB- and TS-trunk identifications are applied directly over leads 65 and 66, respectively, on a 1-out-of-6 and 1-out-of-20 basis through OR gates 55 and 56 to the address decoder 32.

The output of the decoder 32 is applied over the memory address cable 28 directly to the memory 25 to address the specific one of the 3600 trunk locations in the memory for that trunk. Cable 28 may advantageously comprise 120 leads divided into two groups of 60 leads arranged to control the 60 by 60 coordinate addressing circuitry of the memory 25, thereby uniquely defining each of the 3600 addresses in the memory. Associated with the addressing leads 28 through OR gate 69 is a delay circuit $D_w$, FIG. 6, which enables the release lead RLS through the enabled gate 70; the other enabling input to the gate 70 is from the inhibit lead 44. The delay of circuit $D_w$ is long enough for the completion of the writing cycle at the selected address in the memory 25 and is advantageously a matter of only a few microseconds.

Energization of lead RLS through the closed marker connector relay contacts MC- causes operation of relay RL in the marker, which in turn opens the normally closed contacts RL-2 thereby removing the ground at the closed marker ON contacts from the MP relay in the connector 27, thus removing this marker's bid for the traffic usage register for this call; should it be necessary for the marker to recycle and select another trunk, the relay RL would also be included in the recycle as is well known.

3. Address Register and Counter

As is shown in FIG. 2, the address counter 33 is divided into four individual counters 35, 36, 37, and 38 labelled 3M6B, 5M20, 3M5, and 3M6A, respectively. These include advantageously 3, 5, 3, and 3 flip-flops, respectively, arranged to count to 6, 20, 5, and 6, respectively, as indicated by their labels. The first three sections 35, 36, and 37 are tied together so that each input pulse on lead 71 to the first section 35 advances that counter one step. Counter 36 advances one step for each cycle of counter 35, and counter 37 advances one step for each cycle of counter 36. Thus this set of three counters makes one complete cycle for every 600 input pulses on lead 71. The carry from counter 37 advances counter 38; however, counter 38 may also be advanced by a pulse on lead 73 through OR gate 74. Lead 73 is energized by operation of the circuitry associated with the trunk status memory flip-flop F/F 0-5, as discussed further below.

Associated with the first three counter sections 35, 36, and 37, which define the address register, are decoders 75, 76, and 77 which convert the binary information from the counters into 1-out-of-6, 1-out-of-10, and 1-out-of-10 information so that the six 100-point trunk crossbar switches 10-0 through 10-5 may be actuated from these address counters. Specifically, decoder 75 selects and operates, through enabled AND gates 80, one of six relays T0 through T5, thereby selecting one of the six trunk switches 10-0 through 10-5. With all the relay contacts PLC0-6 through PLC5-6 normal and assuming inhibit lead 85 is not energized, the set input of flip-flop 83 is energized through gate 82 thereby operating the flip-flop. Operated flip-flop 83 applies the enabling signals over lead 81 to the gates 80 to allow operation of one of the six relays T-, which in turn direct the 20 leads from the second and third decoders 76 and 77 to the proper trunk crossbar switch 10-. Thus as seen, energization of relay T0 causes closure of contacts T0-1 through T0-10, allowing the energized one of the leads from decoder 76 to operate one of the select magnets SM0-SM9 of trunk switch 10-0 and allowing the energized one of the leads from decoder 77 to operate one of the hold magnets HM0-HM9 of that trunk switch. Similarly, operation of the other T- relays selects a different one of the trunk switches 10 and causes the operation of the selected hold and select magnets therein.

As seen in FIG. 1, operation of any of the hold magnets completes an obvious path for operation of relay PLC0 which through closure of contacts PLC0-7 in each of the detectors 15-0 through 15-5 applies an enabling battery through relays 40 to the detector tubes 87. Operation of any of the PLC- relays also opens the normal contacts PLC- —6 removing the operating ground from the set terminals of flip-flop 83.

4. Recognizing Idle Trunks

In accordance with an aspect of my invention, the busy or idle status of the trunks being scanned by the trunk switches 10 is detected and employed to prevent unnecessary operations of the memory 25 and the NXX switches 11. This operation involves the six trunk status memory elements or flip-flop circuits F/F-0 through F/F-5, FIG. 4, and the associated logic circuitry.

When a specific group of six trunks is being scanned by one of the trunk switches 10 under control of the counters 33 and associated decoders, as just discussed above, the PLC- relay for that switch is operated. Closure of the contacts PLC- —7, as noted above, allows the tubes 87 to conduct if a trunk is busy, i.e., if a signal appears on the lead 14 connected to the grid of that tube. Conduction through a tube 87 operates the associated relay 40- in its plate circuit.

Operation of relay PLC- also closes contacts, such as PLC0-0 through PLC0-5 applying ground to a path 90- through the normally closed contacts 40- —(1) of the detector relays 40-0 through 40-5. If we consider the first trunk of the group of six for the moment, if it is idle, then its detector relay 40-0 will be unoperated. Accordingly, a path can be traced from ground through the operated make contacts PLC0-0, the idle break contacts 40-0(1) over lead 90-0, through inverter 89-0 to the set input of flip-flop F/F-0. Needless to say, if the trunk is not idle, this path is broken at break contacts 40-0(1).

If the 3M6A counter 38 were in its first position, the "0" output lead 95-0, FIG. 4, of decoder 78 would have a signal applied to it to provide one enabling signal to gate S-0. Since the flip-flop F/F-0 has just been set, indicating the idle status of the trunk, gate S-0 is enabled and applies a signal through OR gate 92, timing gate 94, and OR gate 93 to lead 73 to advance the counter 3M6A one position. Clock source 31, in memory 25, is connected to the other input CP of the timer gate 94 and advantageously provides synchronization or clock pulses at a rate compatible with the electronic circuits and memory addressing speed of the specific embodiment, which rate may be 100 K Hz. It should be noted that the lead CP, indicating connection to the clock pulse source 31, appears on a number of gates, as further set forth below.

5. Reading the Memory

With the 3M6A counter 38 in position 2, i.e., with lead 95-1 from decoder 78 energized, let us assume that flip-flop F/F-1, not shown, is unoperated, indicating the busy status of the trunk being scanned at that time. The memory address leads 28, as discussed above, direct the memory 25 to this address location, as determined by the outputs of the counters 35, 37, and 38, as decoded by the address decoder 32.

The address signals on the address leads 28 cause an enabling signal to be applied through OR gate 96 and the closed one of the contacts PLCO-8 through PLC5-8 to operate the memory reading gates R-0 through R-18 after a short time delay $D_r$; delay $D_r$ is desirable to stabilize the reading of the memory. When the reading gates R- are enabled and with no inhibiting signal being present on the inhibit lead 44 from the TUR connector 27, the information present at the addressed trunk location in the memory 25 is read out through the gates R- and through loading gates LR-0 through LR-18 to load the NXX register 40 with the call destination information read from the memory. This information is read into the NXX register 40 in 19 bits corresponding to 2-out-of-5 for each central office code digit and 1-out-of-4 bits for the NPA or area code.

The output of the NXX register is decoded by decoders 100, 101, 102, and 103 into a 1-out-of-6 code on leads 105, a 1-out-of-6 code on leads 106, a 1-out-of-10 code on leads 107, and a 1-out-of-10 code on leads 108.

The signal on the energized lead 106- is applied through the gate 110-, which is enabled since flip-flop 112 is set as all the PLD- relays are normal at this time, to energize one of the relays NO through N5, thereby selecting the particular one of the six NXX switches 11 to be employed in recording the traffic usage for that call destination. The outputs of decoders 102 and 103 on leads 107 and 108 are applied through closed contacts of the operated one of the N- relays to operate the desired select and hold magnets of the selected NXX switch, in the same manner as priorly described with respect to the trunk switches 10.

When any hold magnet of an NXX switch 11 is energized, the PLD- relay of that switch is energized, such as PLD0, FIG. 5. Closure of any of the contacts PLD0-2 through PLD5-2 will apply an inhibiting ground on lead 114 to the LR- gates preventing any further loading of the NXX register 40 at this time. Ground on lead 114 will also enable the PM- gates, since the flip-flop 112 is still set, to place the coded NXX or call destination information read from the memory 25 through the R- gates into the match circuit 42.

In the match circuit 42 the information read from the memory is matched against the information then in the NXX register 40, producing an output on the match lead M, for a match, or an output on the no match lead NM if a match does not occur. At this time a match indication on lead M is given since the information read from the memory 25 is the same as that recorded in the register 40.

6. Scoring the Recording

When the match circuit 42 indicates a match has occurred, the M lead applies an enabling signal to each of the six gates 115-0 through 115-5, FIG. 3. Six trunks are simultaneously connected, by the selected trunk switch 10 and the particular energized select and hold magnets, as determined by decoders 75, 76, and 77, as discussed above, to their respective detectors 15-0 through 15-5. If a signal is present on any of the trunk sleeve leads, the detector 15 is energized operating its relay 40. Closure of the make contacts 40-—(2), such as contacts 40-0(2) in FIG. 3, applies a second enabling signal to the gates 115-. The outputs of all of the gates 115- are multiplied together. Accordingly, the selection of the specific gate 115- and thus of the specific trunk whose traffic measurement is to be recorded or scored, is determined by the decoder 78 and the specific one of its output leads 95 which is active. Since we have assumed that the counter 3M6A is in its second position, lead 95-1 is energized and accordingly gate 115-1 will be enabled.

At this point it must be noted that the outputs of the gates 115 are all connected together and that the operations leading up to this multiple point are concerned with the designation of the specific trunk to be monitored. The common output from the gates 115 is connected to make contacts of six individual relays 118-0 through 118-5. The operations extending from this multiple point through these contacts are concerned with the selection of the specific lead to the encoding, metering, or scoring equipment in accordance with the address or destination of the call being served on that particular trunk. Specifically, the decoder 100 operates to select one of six output leads 105 directly operating one of the relays 118. With the particular NXX switch 11 and the specific hold and select magnet having been selected by the other outputs of decoders 100, 102, and 103, as described above, operation of one of the relays 118 selects an individual one of the leads through the operated NXX switch crosspoint to the registering equipment.

A signal on any of the leads 105 also applies a signal through OR gate 120, AND gate 121, assuming one of the trunks of the group being monitored is active, and closed contacts PLD0-3 through PLD5-3 through a delay circuit $D_s$ to the set terminal of one of the flip-flops F/F-0 through F/F-5 through the enabled AND gate SR-0 through SR-5. Since we have assumed that lead 95-1 is active at this time, gate SR-1, not shown, would be enabled thereby setting flip-flop F/F-1, not shown. Advantageously, the delay $D_s$ is included to allow time for the scoring or recording of traffic registration.

As before, the 3M6A counter 38 will now be advanced, over lead 73, to the next position representing an unoperated one of the flip-flops F/F.

When there is no match indicated by match circuit 42, the no match lead NM is active and the counter 38 is advanced directly through the AND gate 98 and OR gate 93 without operating a flip-flop F/F.

7. Recycling the 6-stage Counter 3M6A

When there is no match indicated by the match circuit 42, lead NM is active, as discussed above. If the 3M6A counter 38 has counted to its last position, decoder 78 provides a signal on lead 95-5 which, together with the NM signal, enables AND gate 120, FIG. 4. The output signal from gate 120 is applied through OR gate 125 over lead 126 to the reset terminal of flip-flop 112, thereby resetting that flip-flop, and to a release input to the NXX register 40, thereby releasing that register.

The release of the NXX register 40 releases the selected NXX crossbar switch 11 and the associated multi-contact relay N-. Further, with the flip-flop 112 now in its 0 state, a signal from the 0 output of the flip-flop is applied over lead 128 to enable the AND gate 129, the other input of which is lead 95-5 which, as noted above, is active at this time. The output of AND gate 129 is connected through the OR gate 93 to lead 73 to advance the 3M6A counter 38, as discussed above.

The recycle of this counter 38 permits the process just described to be repeated except that when the counter next stops at the next address represented by an unoperated one of the flip-flops F/F, a new NXX code will be read into the NXX register 40.

8. All Flip-Flops F/F-0 through F/F-5 Operated

When all of the status memory flip-flops F/F-0 through F/F-5 have been operated, gate A is enabled. Lead 130 from gate A is connected to OR gate 125 and serves to reset the flip-flop 112 and release the NXX register 40 over lead 126 as discussed just above. Lead 130 is also connected to the reset inputs of all of the flip-flops F/F, thereby releasing them. Lead 130 is also connected to the reset terminal of flip-flop 83, thereby resetting that flip-flop. This disables gates 80, thereby releasing the priorly selected trunk switch 10. Finally lead 130 is also connected to reset the 3M6A counter 38 and, through gate 131, to the input lead 71 to the first counter circuit 35; thus when lead 130 is pulsed the address counter 33 is advanced so that the next six trunks may be addressed in the memory 25 and the appropriate trunk crossbar switch 10 set to this new address.

Flip-flop 83 is again set when the operated PLC-relay released as long as gate 82 is not inhibited. This gate, as well as gate 131, will be inhibited only when the last memory address is reached, thereby applying a signal on lead 3599 to gate 135, and clock contacts C1 are opened. Contacts CL open for 1 second each 100 seconds, under control of a clock circuit, now shown, to permit a full cycle of operations only once every 100 seconds, thereby allowing the recording usage data to be collected in CCS units.

III. System Operation

With the above detailed description of the system organization in mind a further appreciation of my invention may be gained from a summary of the operations of the specific illustrative embodiment depicted.

Let us consider that the system has just operated to advance the address counter 33. At this point the address decoder 32 provides an address identifying the 1-out-of-3600 trunks to be examined. The status memory flip-flops F/F-0 through F/F-5 are released as is the NXX register 40.

The trunk crossbar switch 10 is operated in accordance with the address from the decoders 75 through 78 and six trunks are examined. If they are idle, the corresponding six status memory flip-flops F/F-0 to F/F-5 are operated, indicating that all six trunks being brought through the trunk crossbar switch 10 at this time are idle; accordingly, the counter 33 is advanced and the counter 38 reset so that the process may be repeated for the next trunk crossbar switch address and six more trunks at that cross-point.

If all of the status memory flip-flops F/F-0 through F/F-5 are not operated, indicating that some trunks of the six being addressed at that specific crosspoint of the selected trunk crossbar switch 10 are busy, the 3M6A counter 38 is advanced to a position corresponding to the first unoperated flip-flop F/F. Counter 38 is a six-stage counter and addresses the memory 25 at the six locations corresponding to the six trunks brought through any particular crosspoint of the trunk crossbar switches 10. If at this point the NXX register 40 is not set, the information read out of the memory 25 at this address is used to set the register 40. The NXX crossbar switch 11 is then set and the meter, recording equipment, or other registration device is enabled or scored, if the trunk is still busy. The flip-flop F/F associated with this particular trunk is now operated and once again all the flip-flops F/F are examined.

If at least one of the flip-flops F/F is still unoperated, the address counter 38 is advanced to the next unoperated flip-flop F/F. Since the NXX register 40 is now set, the NXX data read from the memory at this address is compared with the data previously read into the NXX register. If they are the same, the recording equipment may be again enabled or scored at the same setting of the NXX crossbar switch. The trunk addresses are advantageously chosen to allow those trunks likely to be reaching the same destination to appear together in groups of six, so that the NXX crossbar switch will not necessarily advance once for each trunk being scanned; however, the circuits are arranged so that the NXX crossbar switch can advance if in fact the next trunk scanned has a call thereon to a different destination.

If no NXX number match occurs, the address counter 38 is examined to see if it is at its last position. If the counter is not at its last step and there is no match, the sequence is advanced without operating the status memory flip-flop F/F corresponding to this address. The circuit then looks over the remaining trunks of the six at this operated trunk crosspoint to see if any of the others are carrying calls destined for the same NXX code. Each time such a trunk is found, the recording equipment is enabled and the corresponding flip-flop F/F operated. Eventually all of the flip-flops F/F will be operated or the counter 38 will arrive at its sixth or last position.

When the counter 38 is found to be at the end of its cycle, the NXX register 40 is released and the counter is again advanced to the position of the next unoperated flip-flop F/F, which in this case will be an earlier one. Since the NXX register 40 is not now set, it will be reset with the NXX code currently associated with this trunk so that the recording equipment can register the trunk usage for the proper NXX or destination address. This process of resetting the NXX register and the NXX switch 11 continues until each of the six trunks associated with the operated trunk switch crosspoint has been served, as indicated by its corresponding flip-flop F/F being operated. Once again when all the flip-flops are operated, the NXX register 40 is released, the flip-flops F/F are reset, and the address corresponding to the crosspoints on the crossbar switch and the address register counters 35, 36, 37 for the trunk crossbar switch 10 are advanced.

When a complete cycle of the address register on counter 33 has been completed, it is inhibited from recycling until a 100 second clock has advanced through a full cycle, as controlled by contacts CL, thus ensuring that the trunks and memory addresses generate a full cycle only once every 100 seconds.

If at any point a marker wishes to write a NXX code into the memory 25 at a specific trunk address, it will momentarily interrupt the process of trunk scanning and traffic registration just described.

What is claimed is:

1. In a communication system having a plurality of trunks to be monitored for traffic usage, means for detecting traffic usage on said trunks, traffic recording means, a memory, means for writing in said memory indicia representing the destination of calls on said trunks, and means including said memory for simultaneously connecting one of said trunks to said detecting means and for causing said detecting means to operate said traffic recording means in accordance with the call destination identification in said memory for said one trunk.

2. In a communication system, the invention of claim 1 wherein said last mentioned means includes first switch means for connecting said trunks to said detecting means, second switch means for connecting said detecting means to said traffic recording means, means for operating said first switch means in accordance with the identity of a trunk, and means for operating said second switch means in accordance with the call destination indicia in said memory associated with said trunk identity.

3. In a communication system, the invention of claim 2 further comprising means for controlling said writing means to write in said memory at an address defined by said trunk identity said call destination indicia for the call presently being served by said trunk.

4. In a communication system, the invention of claim 2 wherein said first switch means includes first crosspoint means connected to a plurality of trunks and said second switch means includes second crosspoint means connected to a plurality of inputs to said recording means, and wherein said detecting means includes a plurality of detector circuits, the combination further comprising first means connected to said detector circuits for selecting a particular one of said plurality of trunks connected to said first crosspoint means and second means connected to said first means for selecting a particular one of said plurality of inputs to said recording means connected to said second crosspoint means.

5. In a communication system, the invention of claim 4 wherein said means for operating said second switch means comprises register means for storing call destination indicia from said memory, the combination further comprising means responsive to a first busy one of said plurality of trunks connected to a particular crosspoint means for reading said call destination indicia for said first busy one trunk from said memory into said register, means responsive to busy others of said plurality of trunks connected to said particular crosspoint means for comparing the call destination information in said memory for said other busy trunks with said call destination information then in said register, and means responsive to failure of a match for other busy ones of said plurality of trunks for clearing said register.

6. In a communication system having a plurality of circuits to be monitored for traffic usage, means for detecting traffic usage on said circuits, first switch means for connecting said circuits to the input of said detecting means, second switch means for connecting the output of said detecting means to traffic usage recording means, and means for operating said first switching means in accordance with the identity of a circuit and for operating said second switch means in accordance with the call destination of the call being served by said circuit, said last mentioned means including memory means and means for storing in said memory means at an address defined by said circuit identity call destination information for the call being served by said circuit.

7. In a communication system, the combination in accordance with claim 6 wherein said traffic usage recording means have a plurality of input leads, wherein said first switch means includes means for connecting to a plurality of said circuits simultaneously, wherein said second switch means includes means for connecting to a plurality of said input leads simultaneously, and wherein said detecting means includes a plurality of individual detectors, one for each of said plurality of said circuits, said combination further comprising first logic circuitry for gating a signal on only one of said plurality of circuits through said detecting means at a time, and second logic circuitry connected to said first logic circuitry for gating said signal through to only one of said plurality of input leads at a time.

8. In a communication system having a plurality of trunks to be monitored for traffic usage, means for detecting traffic usage on said trunks, switch means for connecting said trunks to said detecting means, means for controlling said switch means in accordance with specific trunk identifications, and means responsive to said detecting means for storing traffic usage information for said trunks dependent on the call destination of calls on said trunks, said last mentioned means including a memory, means for storing call destination indicia in said memory at addresses defined by trunk identifications, and means for addressing said memory in accordance with said specific trunk identifications controlling said switch means.

9. In a telephone system, traffic recording means, first crossbar switch means connected to individual trunks to be monitored, second crossbar switch means for selectively applying signals to said traffic recording means, detector means interposed between said first and second crossbar switch means, and control means for operating said first and second crossbar switch means, said control means comprising means for controlling said first crossbar switch means to connect the trunks being monitored to said detector means, and means for controlling said second crossbar switch means to connect said detector means to said traffic recording means in accordance with the destination to which the monitored trunks are connected.

10. In a telephone system, the combination in accordance with claim 9 wherein said control means comprises memory means for storing indicia representing said destination associated with each particular trunk being monitored.

11. In a telephone system, the combination in accordance with claim 10 further comprising marker means for determining the identity of a trunk and the identity of the destination to which that trunk is to be connected and memory input means connected to said market means for writing in said memory means said indicia of the destination identity associated with said trunk identity.

12. In a telephone system, traffic recording means, first switch means including a plurality of crosspoint means each for simultaneously connecting to a plurality of trunks to be monitored, second switch means including a plurality of crosspoint means each for simultaneously connecting to a plurality of input leads to said traffic recording means,
detector means connected to said first switch means for detecting the status of said trunks,
trunk address means for causing said first switch means to close specific crosspoint means therein,
register means for storing identifications of destinations of connections on said trunk means,
means responsive to said register means for causing said second switch means to close specific crosspoint means therein, and
means connected between said detector means and said second switch means for specifying the particular one of said trunks connected to a first switch crosspoint means and the particular one of said traffic recording input leads to be connected together.

13. In a telephone system, the combination in accordance with claim 12 wherein said trunk address means includes at least one counter circuit,
a plurality of status memory elements, the number of status memory elements being equal to the number of trunks connected to each said first switch crosspoint means,
means including said detector means for energizing said status memory elements in accordance with the status of said trunks, and
means responsive to said status memory elements for advancing said counter circuit.

14. In a telephone system, the combination in accordance with claim 13 wherein said first and said second switch means each includes a plurality of crossbar switches.

15. In a telephone system,
traffic recording means,
means for connecting to a plurality of trunks simultaneously,
means connecting said trunk connecting means to said recording means,
status memory elements equal in number to the number of said plurality of trunks,
means for detecting the busy/idle status of said trunks and for operating said status memory elements in response thereto, and
means for controlling said connecting means responsive to said status memory elements.

16. In a telephone system the combination of claim 15 wherein said means for operating said status elements includes means for operating each status memory element on the idle condition of a trunk and further comprising means for operating each status element on the operating of said recording means for a busy one of said trunks.

17. In a communication system having a plurality of circuits to be monitored for recording traffic usage,
a memory,
a register,
means for storing in said memory destination information pertinent to the call present on each of said circuits,
a plurality of circuit status memory control elements equal to a predetermined number of said circuits,
means for transferring from said memory to said register the destination information for one of said circuits,
means for comparing said transferred destination information in said register with the destination information in said memory for the remaining predetermined number of said circuits which are busy, and
means for operating said status memory control elements for those of said predetermined number of circuits which are idle and for those which are busy but whose busy state has been recorded.

18. In a communication system, the combination in accordance with claim 17 further comprising means for examining the state of each of said status memory control elements and for clearing said register on the examination of the last of said status memory control elements.

19. In a communication system, the combination in accordance with claim 18 further comprising means for resetting said status memory control elements on the examining of the last of said status memory control elements if all said status memory control elements have been operated.

20. In a telephone system having a plurality of trunks to be monitored for recording their traffic usage by recording equipment,
means for detecting traffic usage on said trunks,
switch means for connecting a plurality of said trunks to said detecting means,
trunk status memory elements equal in number to said plurality of trunks,
means for setting said status elements for those of said plurality of trunks which are idle,
means for examining each of said status elements in succession,
means for successively connecting said detecting means to recording equipment for each trunk of said plurality which is busy,
means for setting each said status element for those of said plurality of trunks which are busy but whose traffic usage has been recorded, and
means for resetting said trunk status elements and for advancing said switch means when all of said trunk status elements have been set.

21. In a telephone system,
traffic recording means having a plurality of inputs,
first switch means connected to individual trunks to be monitored,
second switch means selectively applying signals to said traffic recording means,
detector means interposed between said first and said second switch means, and
control means including
a memory for storing specific indicia associated with each trunk being monitored,
means for operating said first switch means to connect specific trunks to said detector means, and
means for operating said second switch means in accordance with said specific indicia stored in said memory for said specific trunks to connect said detector means to particular ones of said inputs of said traffic recording means.

22. In a telephone system, the combination in accordance with claim 21 wherein said means for operating said first switch means includes counter means for connecting said trunks sequentially to said detector means, said second switch means selectively connecting said detector means to said traffic recording means inputs in accordance with said stored indicia.

23. In a telephone system, the combination in accordance with claim 22 further comprising means for storing said indicia in said memory at memory locations assigned to said specific trunks.

24. In a telephone system having a plurality of circuits to be monitored for traffic usage, the combination comprising a memory means for storing in said memory at memory locations assigned to each circuit specific indicia for each circuit, means for detecting traffic usage on said circuits, traffic recording means, and control means including said memory for simultaneously connecting one of said circuits to said detecting means and for causing said detecting means to operate said traffic recording means in accordance with said specific indicia for said one circuit.

25. In a telephone system, the combination in accordance with claim 24 wherein said control means includes switch means for connecting said circuit to said detecting means and further comprising means for supplying to said storing means for each busy circuit indicia representing the call destination for the communication then present on said each busy circuit.

* * * * *

UNITED STATES PATENT OFFICE
CERTIFICATE OF CORRECTION

Patent No. 3,760,110 Dated September 18, 1973

Inventor(s) Amos Edward Joel, Jr.

It is certified that error appears in the above-identified patent and that said Letters Patent are hereby corrected as shown below:

Column 1, line 23, "10" should be --100--

Column 2, line 24, "destinations" should be --destination-- line 44, "at" should be --to--

Column 3, line 23, after "against" delete "what"

line 25, after "the" delete "unoperated" and substitute --circuit-- line 35, after "next" delete "unoerated" and substitute therefor --unoperated--

Column 4, line 16, after "are" change "multiplied" to --multipled-- lines 23 and 24, after "17" delete "multiplied" and substitute therefor --multipled-- line 54, after "a" delete "marker" and substitute therefor --memory--

Column 5, line 51, after "is" delete "located" and substitute therefor --loaded-- line 53, after "trunk" add --and--

Column 6, line 20, after "the" cancel "TEK" and substitute therefor --TFK--

Column 7, line 34, "flip flop" should be --flip flops--

Column 8, line 58, after "35" insert -- 36, --.

Column 11, line 18, before "shown" change "now" to --not--

Column 14, line 58, before "means" first occurrence, change "market" to --marker--

Column 16, line 45, after "means" insert --for--

Signed and sealed this 26th day of March 1974.

(SEAL)
Attest:

EDWARD M.FLETCHER,JR.
Attesting Officer

C. MARSHALL DANN
Commissioner of Patents